Jan. 28, 1941.  A. C. ELDER  2,229,644
SAW SHARPENER
Filed Sept. 1, 1937  2 Sheets-Sheet 1
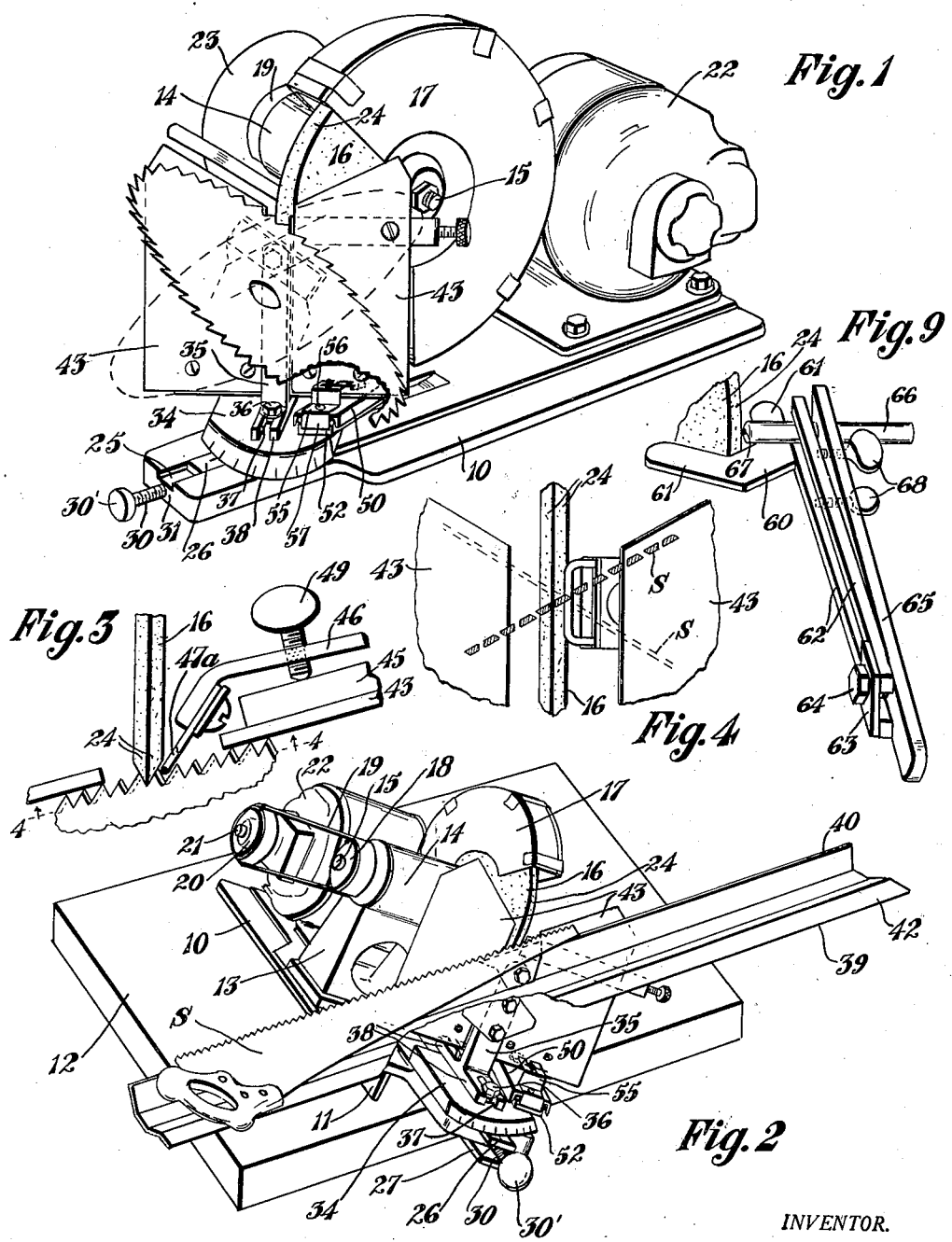
INVENTOR.
Austin C. Elder
BY
ATTORNEYS.

Jan. 28, 1941.  A. C. ELDER  2,229,644
SAW SHARPENER
Filed Sept. 1, 1937  2 Sheets-Sheet 2
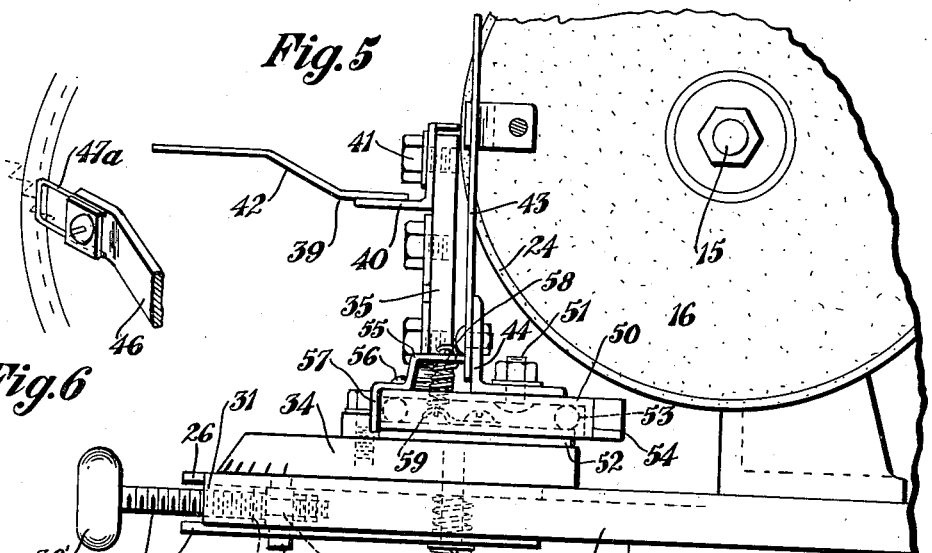
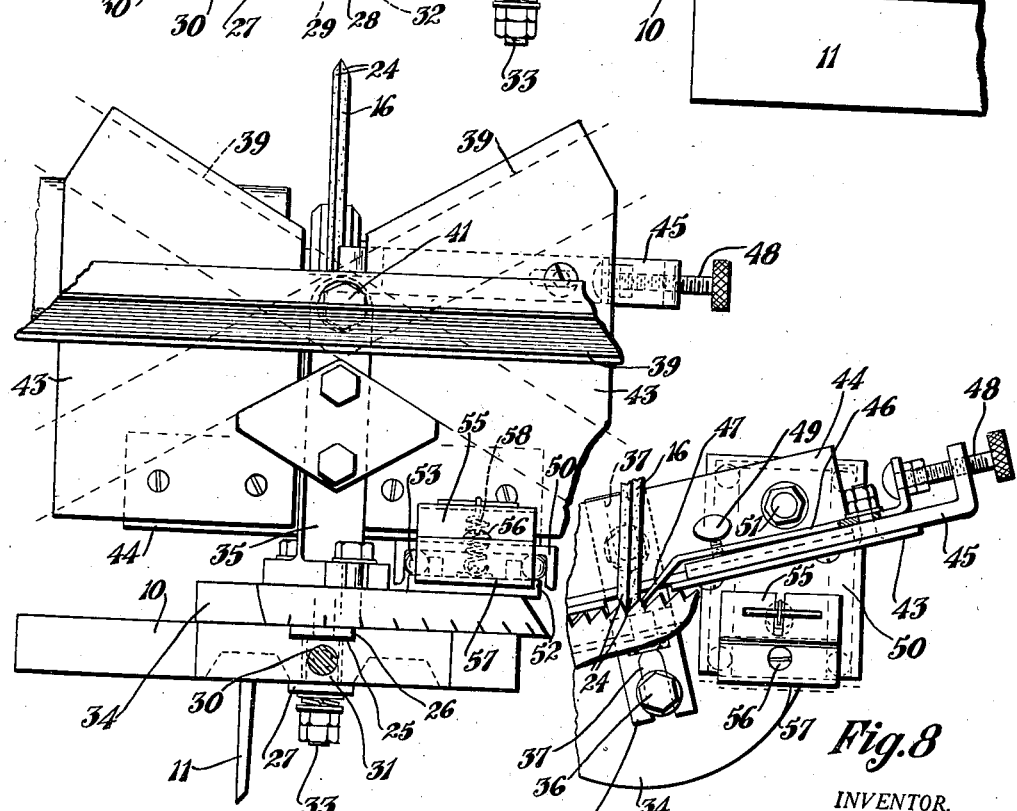
INVENTOR.
Austin C. Elder
BY Frease and Bishop ATTORNEYS.

Patented Jan. 28, 1941

2,229,644

UNITED STATES PATENT OFFICE 2,229,644

SAW SHARPENER

Austin C. Elder, Canton, Ohio

Application September 1, 1937, Serial No. 161,998

4 Claims. (Cl. 76—37)

The invention relates to improvements in saw sharpeners, having reference to machines for sharpening and retoothing reciprocating saws, circular saws and the like, and more especially to improvements upon the saw sharpener disclosed in my prior Patent No. 2,067,179, issued January 12, 1937.

An object of the improvement is to provide a saw sharpener adapted for sharpening and retoothing all kinds of saws of both circular and reciprocating types, such as rip and crosscut saws, one and two man crosscut saws, hand saws, band saws, hack saws and other types of saws.

An important object of the invention is to provide means adjacent to the sharpening wheel for indexing the various kinds of saws in sharpening or retoothing, and pivoted means adjustable laterally in respect to these elements adapted for supporting the various kinds of saws to be indexed and ground.

Another object is to provide alternative means for inclining the indexing means sidewardly with respect to the saw support without affecting the support, whereby the saw support may be inclined sidewardly with respect to the indexing means without affecting the indexing means, as in obtaining bevel adjustments for various kinds of saws.

A further object is to provide an indexing tooth adapted to index each saw tooth independently of the others by engagement of the opposite side of the tooth being sharpened or cut, and to provide means for gauging the depth of engagement of the indexing tooth with the saw tooth.

A still further object is to provide guides for engaging the tooth edge of a saw for gauging the depth of engagement of the indexing tooth with the saw tooth, and to further serve for limiting the movement of the saw over the support toward the sharpening wheel by the engagement of the tooth edge.

Another object is to provide a movable mounting for the guides and indexing tooth for further aiding in guiding the saw into and out of engagement with the sharpening wheel in sharpening or retoothing a saw, and to include provision for a limit for said movable mounting whereby the guides are also adapted to limit the movement of the saw toward the wheel, and to provide optional means for securing said movable mounting against movement when its movement is not needed, as for large tooth saws and all circular saws.

Still another object is to provide means for adjustably mounting the saw support relative to the indexing tooth and guides, adapted for varying the distance between the saw support and latter elements for accommodating various sizes of saw teeth, and to provide a pivoted mounting for all of these elements for permitting a swiveling adjustment relative to the sharpening wheel, and to further provide a slidable mounting for said pivotal mounting adapted for adjustment to and from the sharpening wheel.

Another object of the improvement is to provide means for truing the sharpening wheel whereby separate adjustments for truing each bevel of the wheel are provided so that in adjusting to either bevel the adjustment for the other bevel is not affected.

The above objects together with others which will be apparent from the drawings, or which may be hereinafter referred to, may be attained by constructing the improved saw sharpener in the manner illustrated in the accompanying drawings, in which Figure 1 is a perspective view of the improved saw sharpener arranged for grinding the teeth of a circular saw;

Fig. 2, a perspective view of the machine viewed from the opposite side showing the same adjusted for sharpening the teeth of a hand saw;

Fig. 3, an enlarged fragmentary plan view showing the manner in which the indexing tooth and stops cooperate with a toothed edge of a saw to position the same relative to the sharpening wheel;

Fig. 4, an enlarged detail plan sectional view taken as on the line 4—4, Fig. 3;

Fig. 5, a fragmentary side elevation of the improved sharpener;

Fig. 6, a detail perspective view of the indexing tooth;

Fig. 7, a front elevation of the machine;

Fig. 8, a fragmentary plan view of a portion of the machine; and

Fig. 9, a detail perspective view of the device for truing the sharpening wheel.

Similar numerals refer to similar parts throughout the drawings.

The improved machine is mounted upon a base indicated generally at 10 which may be in the form of a casting of fairly heavy construction provided upon its underside with the depending, longitudinally disposed rib 11 located substantially midway between the side edges of the base, and preferably of such depth that when the base is tilted upon the rib in either direction to rest partly upon the rib and partly upon one side edge of the base, as best shown in Fig. 2, the base will stand at an angle of approximately thirty degrees to the horizontal or the bench or table upon which it rests, which is indicated generally at 12 in Fig. 2.

A support 13 is mounted upon the base and includes a bearing 14 for the grinding wheel shaft 15 which is located substantially parallel to the normal plane of the base and carries the grinding or sharpening wheel 16 at one end, preferably partially surrounded by the guard 17 of any usual and well known construction.

A pulley 18 at the other end of said shaft may be connected as by the belt 19 with a similar pulley 20 upon the shaft 21 of the motor 22 which is mounted upon the rear portion of the base. As shown in Fig. 1, the shaft 15 may also carry a grinding wheel 23 of any ordinary form, which may be used for entirely removing the teeth of a saw which is in bad condition, preparatory to providing a completely new set of teeth thereon, as disclosed in my prior patent above referred to.

The grinding wheel 16, as disclosed in said prior patent, may be a thin wheel preferably provided with a double bevel as indicated at 24, suitable for grinding one edge of one tooth and the adjacent edge of the next tooth simultaneously.

A longitudinal guide groove or way 25 may be formed in the upper surface of the base 10, with which a slide 26 cooperates. This slide is connected to a similar slide 27 upon the underside of the base as by the stud 28 located for longitudinal movement through the slot 29 in the base.

An adjusting screw 30 is threaded through the front portion 31 of the base and has an unthreaded portion 32 swiveled through the stud 28 and may be provided upon its outer end with a knob 30' by means of which the slides 26 and 27 may be simultaneously adjusted longitudinally of the base 10.

Pivotally supported upon the slides 26 and 27, as by the post 33, is a table 34 having a post 35 mounted thereon and adjustable longitudinally of the table as by the screws 36 cooperating with the slots 37 in the feet 38 of the post.

This post carries the saw support indicated generally at 39 which may include an angle iron 40 connected to the upper end of the post 35 as by the screw 41 and extending a considerable distance on each side of the post and adapted to be held in various adjusted positions relative to the post, by means of said screw 41, as indicated in the drawings and especially as clearly shown in broken lines in Fig. 7.

If desired, the saw support may include the angular plate 42 which may be welded or otherwise secured to the angle iron 40 and which forms a rest for the saw, as indicated at S in Fig. 2.

Stops to limit the movement of the saw toward the grinding wheel 16 may comprise a pair of stop plates 43 fixed to a transversely disposed angle iron 44 supported as hereinafter described.

An angular bracket 45 is connected to the rear face of one of the stop plates 43 for supporting the indexing tooth which comprises a bar 46 having the angular inner end or tooth portion 47 for engagement with a tooth of the saw to be sharpened, as shown in the drawings and which, if desired, may be in the form of a wire loop, as shown at 47a in Figs. 3 and 6.

The bar 46 is adjustable longitudinally upon the bracket 45 as by the adjusting screw 48 and is adjustable transversely as by the adjusting screw 49 so that the indexing tooth may be set at the desired position for properly indexing the teeth of any type of saw to be sharpened.

The angle iron 44 is pivotally connected to the inverted channel plate 50 as by the bolt 51. This channel plate is mounted upon the ball track 52 which is fixed upon the table 34 in any suitable and well known manner, anti-friction balls 53 being located between the ball track and the channel plate. The rear end of the channel plate is provided with a downturned flange 54 and a bracket 55 is connected to the forward end of the channel plate as by the screw 56, said bracket having a depending flange 57, whereby the balls 53 are retained in place between the track and channel plate to permit longitudinal movement of the channel plate upon the track. In order to connect the channel plate and track together allowing a limited movement therebetween, a spring 58 is connected to the bracket and to a hook 59 upon the track.

For the purpose of dressing or truing the grinding wheel 16, a device is provided as shown in Fig. 9, which includes a bracket 60 which may be clamped to any rigid portion of the machine such as the wheel guard 17 and includes two angular legs 61, against either of which may be slidably contacted one of the spaced parallel bars 62, the outer ends of which are connected as by the clamp plate 63 and screw 64 to the tool holding bar 65, through the opposite end of which is located the tool shank 66 carrying a diamond point or the like, as indicated at 67 and adapted to be adjusted relative to either beveled edge of the wheel 16 as by the adjusting screws 68.

In the operation of the machine to sharpen saws of various kinds, the base may be tilted by means of the rib 11 and the saw support 39 may be tilted relative to the grinding wheel so as to support the saw in substantially horizontal position, as shown in Fig. 2.

The post 35 may be adjusted to properly distance the saw support from the stop plates, and the indexing finger or tooth 47 or 47a may be properly adjusted to allow for various sizes of teeth so that the necessary depth may be cut without damaging the support.

The table 34 may be adjusted angularly relative to the base, as shown in Figs. 1 and 7 so as to properly position the saw relative to the grinding wheel in order to produce the desired grinding of each tooth.

Where it is desired to oppositely bevel the teeth of a saw, adjacent sides of alternate teeth may be first ground with the parts adjusted to position the saw as indicated in full lines at S in Fig. 4, after which the parts are adjusted to position the saw in the broken line position shown at S in said figure and the opposite sides of the teeth are then ground in pairs.

I claim:

1. In a saw sharpener, a base, a grinding wheel supported upon the base, a slide longitudinally adjustable upon the base, a table mounted upon the slide on a vertical pivot, an upright post upon the table, a saw support upon said post means for adjusting the saw support around an axis parallel to the base, a spaced pair of stop plates located one on each side of the post for contact with the toothed edge of a saw to be sharpened, an indexing tooth including a shank portion carried by one stop plate and adjustable longitudinally in a plane parallel to said stop plate, an angular tooth portion on said shank having its free end parallel to the normal plane of the wheel adapted to contact the opposite side of each saw tooth being sharpened, and means for adjusting said shank portion toward and from said stop plate.

2. In a saw sharpener, a base, a grinding wheel supported perpendicular to said base, a saw support mounted adjacent to the periphery of the grinding wheel, means for adjusting said saw support toward and from the periphery of the wheel, means for adjusting the saw support around a pivot substantially parallel to the base, means for adjusting the saw support about an axis substantially perpendicular to the base, and an indexing tooth mounted independently of the saw support and having its free end arranged to remain parallel to the normal plane of the grinding wheel in all radial positions of said saw support.

3. In a saw sharpener, a base, a grinding wheel supported perpendicular to said base, a saw support mounted adjacent to the periphery of the grinding wheel, an indexing tooth mounted independently of the saw support and having its free end located parallel to the normal plane of the grinding wheel means for adjusting said saw support toward and from the periphery of the wheel, means for adjusting the saw support about an axis substantially parallel to the base, and a spaced pair of stop plates for contact with the toothed edge of a saw to be sharpened.

4. In a saw sharpener, a base, a grinding wheel supported perpendicular to said base, a saw support mounted adjacent to the periphery of the grinding wheel, means for adjusting said saw support toward and from the periphery of the wheel, means for adjusting the saw support around a pivot substantially parallel to the base, means for adjusting the saw support about an axis substantially perpendicular to the base, a spaced pair of stop plates for contact with the toothed edge of a saw to be sharpened, an indexing tooth mounted independently of the saw support and having a free end for contact with the opposite side of each saw tooth being sharpened and adapted to remain parallel to the periphery and plane of the grinding wheel in all radial positions of the saw support, and means permitting the stop plates and indexing tooth to yield when contacted by the toothed edge of a saw to be sharpened.

AUSTIN C. ELDER.